United States Patent
Lucey et al.

(12) 
(10) Patent No.: US 6,650,397 B2
(45) Date of Patent: Nov. 18, 2003

(54) MEDIA WIDTH DETECTING SYSTEM FOR AN IMAGING APPARATUS

(75) Inventors: James K. Lucey, Hemlock, NY (US); Barry Klimuszka, Rochester, NY (US); Arthur A. Whitfield, Rochester, NY (US); Andrew R. LaPietra, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 60 days.

(21) Appl. No.: 09/866,184

(22) Filed: May 25, 2001

(65) Prior Publication Data

US 2002/0176059 A1 Nov. 28, 2002

(51) Int. Cl.⁷ .................. G03B 27/52; G01N 29/04; G01H 3/12; G06K 9/74; G01J 1/00
(52) U.S. Cl. .................. 355/40; 355/41; 73/618; 73/599; 356/71; 356/236; 356/299; 250/228
(58) Field of Search .................. 355/40, 41; 73/618, 73/599; 356/236, 71, 399; 250/228

(56) References Cited

U.S. PATENT DOCUMENTS

| | | | | |
|---|---|---|---|---|
| 4,435,834 A | * | 3/1984 | Pauli et al. | |
| 4,623,975 A | * | 11/1986 | Kagami | |
| 4,782,365 A | | 11/1988 | Takagi | |
| 4,982,224 A | | 1/1991 | Yamamoto et al. | |
| 5,036,353 A | | 7/1991 | Sakamoto | |
| 5,236,072 A | * | 8/1993 | Cargill | |
| 5,504,555 A | | 4/1996 | Yamamoto | |
| 5,943,121 A | * | 8/1999 | Patton et al. | |
| 6,008,879 A | | 12/1999 | Masutani | |
| 6,314,812 B1 | * | 11/2001 | Harris | |
| 6,359,287 B1 | * | 3/2002 | Voser et al. | |

* cited by examiner

*Primary Examiner*—Frank G. Font
*Assistant Examiner*—Khaled Brown
(74) *Attorney, Agent, or Firm*—David A. Novais

(57) ABSTRACT

A media width detecting system is adapted to measure an absolute width of media without the need for human intervention or without the need for media to be referenced against a known location. The media width detecting system includes a measuring pattern that is provided across a media path for media. The measuring pattern can be in the form of, for example, a bar code pattern. The system further includes a reader that is provided relative to the measuring pattern so as to read the width of the measuring pattern. When media traverses the measuring pattern, a portion of the measuring pattern, for example, a subset of the bars of the bar code pattern, is covered by the media. The reader would then be adapted to determined a width of the measuring based on the covered portion of the media pattern in relation to the uncovered portion or uncovered bars.

48 Claims, 6 Drawing Sheets

US 6,650,397 B2

MEDIA WIDTH DETECTING SYSTEM FOR AN IMAGING APPARATUS

FIELD OF THE INVENTION

The present invention relates to a system and method for measuring and/or detecting the width of media, such as photosensitive paper, and an imaging apparatus such as a photographic printer which uses the media width detecting system.

BACKGROUND OF THE INVENTION

Currently, photographic printers are capable of utilizing multiple paper widths. However, these printers do not provide for a convenient and accurate system for communicating the paper width to the printer as new unexposed rolls of paper are placed into the printer. Some printers rely on a person that operates the machine to input the paper width manually, either via a computer interface or setting switches or dials. Other printers utilize switches or magnets that are part of an input paper cassette magazine where the switches are set by the person operating the printer. Finally, it is known that an array of discrete sensors, often photo-optic, can be used to directly measure the width of paper without operator intervention.

In the case where an array of discrete sensors are used to directly measure the paper width without operator intervention, the sensors are physically placed on the paper track such that they detect the popular widths of photosensitive paper. However, when using a discrete array of sensors, one edge of the paper being measured is required to be geometrically known. In other words, one paper edge must be located against a guide of known location from the sensor array. Without this reference edge, the true paper width cannot be accurately measured.

SUMMARY OF THE INVENTION

The present invention provides for an improved system and method for measuring an absolute width of media, such as paper photosensitive film, photographic paper, cut sheets, a web, etc., without the need for human intervention and/or without the need for the paper to be referenced against a known location or guide. To accomplish the measurement without a reference and known location of a paper guide or edge, the paper and any location in a paper tracking mechanism is measured from one edge to the other. The present invention provides for an accurate and simple mechanism that detects both edges and the span therebetween.

In a feature of the present invention, a media width detecting system uses a measuring pattern which, for example, can be a plurality of bars placed across the width of the paper track. The bars can be either permanently placed or be in the form of a sticker or label placed across the width of the paper track. The bars can be spaced at known intervals or can be at variable intervals depending on the method of measuring. When media such as photosensitive paper is placed in the paper track, a subset of the bars are physically covered up or blocked. By using a reader in the form of, for example, an optical scanner, the number of uncovered and covered bars can be easily computed. From this, the paper width can then be determined.

The present invention provides for a media width detecting system that comprises a measuring pattern provided across a width of a media path; a reader positioned to view a full width of the measuring pattern, wherein media in the media path that traverses the measuring pattern blocks or covers up a portion of the measuring pattern from being viewed by the reader and leaves other portions of the measuring pattern exposed for viewing by the reader; and a computing device operationally associated with the reader that determines a width of the media traversing the measuring pattern based on a difference between the full width of the measuring pattern and a width of the other portions of the measuring pattern left exposed for viewing by the reader when the media traverses the measuring pattern.

Within the context of the present invention, the description with respect to the computing device being operationally associated with the reader refers to the fact that the present invention can provide for a computing device separate from the reader and integrated into the hardware of the imaging apparatus that is processing the media, a computing device separate from both the reader and imaging apparatus and connected to both, or a computing device integrated into the reader.

The present invention further provides for a media width detecting system that comprises a bar code pattern including a predetermined number X of total bars provided at intervals on a media path so as to extend along a width of the media path; a reader provided relative to the media path so as to view an entire width of the bar code pattern, wherein the media in the media path that traverses the bar code pattern provides for a first number N of uncovered bars on one side or both sides of the media that can be read by the reader; and a computing device operationally associated with the reader that computes a second number W of bars covered by the media traversing the bar code pattern based on a difference between the predetermined number X of total bars and the first number N of uncovered bars to determine a width of the media transversing the bar code pattern.

The present invention further relates to a media width detecting system that comprises a measuring pattern; a reader positioned to view the measuring pattern, wherein media that traverses the measuring pattern blocks a portion of the measuring pattern from being viewed by the reader; and a computing device operationally associated with the reader that determines a width of the media traversing the measuring pattern based on at least a width of the portion of the measuring pattern blocked by the media traversing the measuring pattern.

The present invention further relates to a media size detecting system that comprises a first measuring pattern provided across a width of a media path; a second measuring pattern provided on the media path so as to extend along a longitudinal direction of the media path; and a reader adapted to read the first measuring pattern to determine a width of media traversing the first measuring pattern, and read the second measuring pattern to determine a length of media traversing the second measuring pattern.

The present invention further relates to a method of measuring a size of media being conveyed along a media path which comprises providing a first measuring pattern across a width of the media path; positioning a reader relative to the media path so as to view a full width of the first measuring pattern; and determining a width of media in the media path which traverses the first measuring pattern based on at least a width of a portion of the first measuring pattern which is blocked from being viewed by the reader by the media traversing the first measuring pattern.

The present invention further relates to a printing apparatus that comprises a media supply section having at least one media entry opening for the passage of media therethrough; a printing section adapted to accept media from the media supply section; a media path for the passage of media from the media supply section to the printing section; and a media width detecting system positioned on the media path. The media width detecting system comprises a measuring pattern provided across a width of a media path; a reader positioned relative to the media path to view the measuring pattern, wherein media in the media path that traverses the measuring pattern blocks a portion of the measuring pattern from being viewed by the reader; and a computing device operationally associated with the reader that determines a width of the media traversing the measuring pattern based on at least a width of the portion of the measuring pattern blocked by the media traversing the measuring pattern.

The present invention further relates to a printing apparatus that comprises a media supply section that has at least one media entry opening for the passage of media therethrough; at least one media supply cassette having a media supply roll therein and positioned at the at least one media entry opening to supply media to the media supply section; a printing section adapted to accept media from the media supply section; and a media width detecting system positioned at an exit of the at least one media supply cassette. The media width detecting system comprises a measuring pattern positioned on a media path at the exit; a reader positioned to view the measuring pattern, wherein media which traverses the measuring pattern blocks a portion of the measuring pattern from being viewed by the reader; and a computing device operationally associated with the reader that determines a width of the media traversing the measuring pattern based on at least a width of the portion of the measuring pattern blocked by the media traversing the measuring pattern.

The present invention further relates to a media width detecting system that comprises a measuring pattern; and a reader positioned to view the measuring pattern, wherein media that traverses the measuring pattern blocks a portion of the measuring pattern from being viewed by the reader, and a width of the media traversing the measuring pattern is determined based on at least a width of the portion of the measuring pattern blocked by the media traversing the measuring pattern.

The present invention further relates to a printing apparatus that comprises a media supply section having at least one media entry opening for the passage of media therethrough; a printing section adapted to accept media from the media supply section; a media path for the passage of media from the media supply section to the printing section; and a media width detecting system positioned on the media path. The media width detecting system comprises a measuring pattern provided across a width of the media path; and a reader positioned relative to the media path to view the measuring pattern, wherein media in the media path that traverses the measuring path blocks a portion of the measuring pattern from being viewed by the reader, and a width of the media traversing the measuring pattern is measured based on at least a width of the portion of the measuring pattern blocked by the media traversing the measuring pattern.

DETAILED DESCRIPTION OF THE INVENTION

Figure 1:
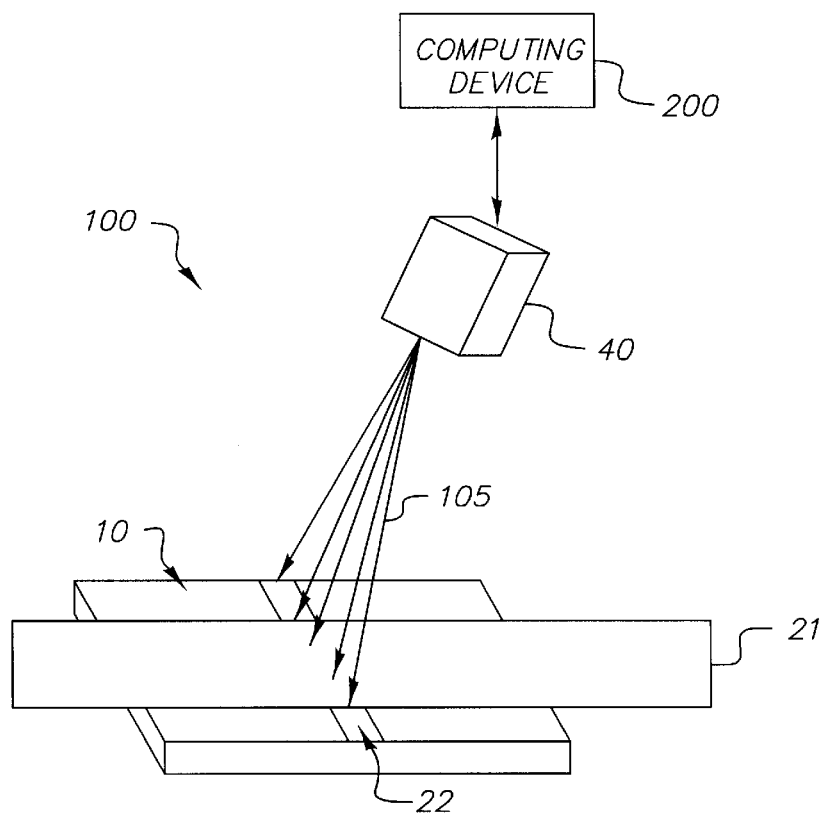
FIG. 1 schematically illustrates a media width detecting system in accordance with the present invention.

Referring now to the drawings, wherein like reference numerals represent identical or corresponding parts throughout the several views, FIG. 1 illustrates a media width detecting system 100 in accordance with a feature of the present invention. As illustrated in FIG. 1, a paper track or media path 10 can be located inside an imaging apparatus, such as, for example, a photo printer, at the location where media paper width measurement is desired. As will be described later, the present invention is not limited to placing media width detecting system 100 inside an imaging apparatus. As a further example, media width detecting system 100 can be placed at an outlet of a paper cassette which feeds media to the imaging apparatus.

Figure 2A:
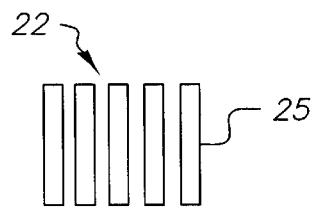
FIG. 2A is an example of a measuring pattern in the form of a bar code having spaced bars that can be utilized in the media width detecting system of the resent invention.
Figure 3:
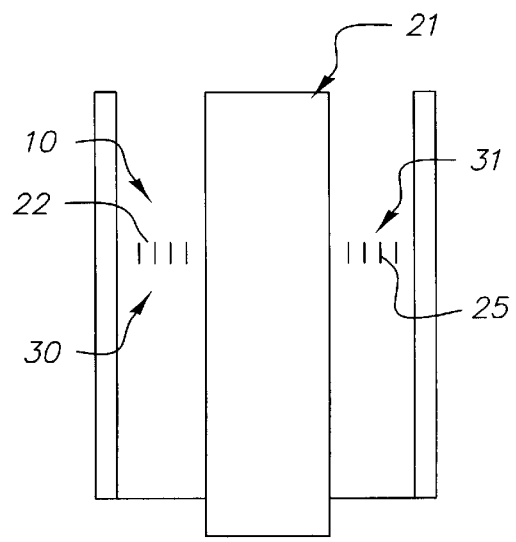
FIG. 3 is a top view of the media width detecting system of the present invention with media traversing the measuring pattern.

Permanently or removably placed on media path 10 is a measuring pattern 22. Measuring pattern 22 can be in the form of a barcode pattern or a series of uniform bars 25 (FIG. 2A) that span across a width of media path 10 (FIG. 3). Bars 25 can be alternating reflective/non-reflective (white and black), as noted in FIG. 2A, and can be comprised of a fixed and known number of bars X. With the arrangement of the present invention, measuring pattern 22 is spaced across a width of media path 10 such that media 21 which is conveyed along media path 10 will traverse measuring pattern 22 to block a portion of measuring pattern 22. Media 21 can be photographic paper, photosensitive film, cut sheets, a web, etc. The size or width of the portion of measuring pattern 22 blocked by the media depends on the width of media 21. More specifically, as illustrated in FIG. 3, when media 21 traverses measuring pattern 22, in the example where measuring pattern 22 is in the form of a bar code pattern, a subset of the total bars of the bar code pattern will be covered. The bars which are not covered are identified by reference numerals 30 and 31 in FIG. 3. For example, in the situation of FIG. 3, the total number of bars of measuring pattern or bar code pattern 22 is equal to X. The total number of bars 30, 31 which are uncovered or not blocked by media 21 can be equal to N, wherein N equals the total number of uncovered bars 30, 31 on one side and/or either side of media 21.

As illustrated in FIG. 1, a reader 40 such as an optical detection apparatus, a scanner, a sensor or an optical bar code reader is provided relative to media path 10 so as to view media 21 as well as the width of media path 10. In the example of FIG. 1, reader 40 is positioned so as to provide for a swept laser or beam 105 across measuring pattern 22 in media path 10. Reader 40 determines by well established methods, the number of bars that are visible on each side of media 21. More specifically, when media 21 traverses measuring pattern 22, a portion of measuring pattern 22, such as for example, a subset of bars 25 will be covered by media 21. The uncovered bars (30, 31) (FIG. 3) on each or both sides of media 21 can be read by reader 40. Therefore, in this embodiment, reader 40 can determine via well established methods the number of bars visible on each side of media 21. In the example of FIG. 3, the total number of exposed bars (30 and 31) are equal to N.

Within the context of the present invention, reader 40 can be associated with a computing device 200 which can be separate from reader 40, can be integrated or built into reader 40, or can be part of the associated printer. Computing device 200 would already know that the total number of bars across the track equals X. In a preferred embodiment, computing device 200 would typically be integral to reader 40, and more specifically integral to a commercial bar-code scanner module, often implemented in single-chip microprocessors such as 68 HC11 and 8051 type devices. Of course, it is recognized that any processor, or computing device having computational features as noted above can be used in the present invention.

Therefore, a signal from reader 40 would be an indication of how many bars are exposed and can be read by reader 40, and more specifically how many bars are not blocked by media 21 traversing media path 10. Having this information, the total number of bars or the subset of bars covered by media 21 would be represented by X-N.

Since the bar spacing of bars 25 of bar code pattern 22 is known and can be fixed, the paper or media width can be easily computed by measuring the number of covered or blocked bars. As a further option, since the width of bars 25 as well as the spacings can be known, the paper width can be easily determined by knowing the number of bars that are covered. Therefore, in the present invention, by knowing the amount or width of measuring pattern 22, it is possible to determine the width of media 21 that traverses measuring pattern 22. With the system of the present invention, it is not necessary to have paper a paper edge guide or to provide for a starting point for determining the width of the media.

Within the context of the present invention, bars 25 can be spaced at a specific distance so that even if the media is skewed when it traverses the measuring pattern or bar code pattern 22, reader 40 can still determine the width of the media since the number of bars covered would not dramatically change with a skewed media. More specifically, if five bars are covered by media traversing a bar code pattern, the spacing of the bars of the bar code pattern could be such that even if the media is skewed within dimensional tolerances, the five bars would still be covered by the media. Of course, reader 40 as well as computing device 200 can be programmed to include an error setting in the event that the media arrives at the measuring pattern completely or overly skewed and covers a plurality and/or substantially all of the bars. In a feature of the present invention, all of the type of media that can be used within the associated imaging apparatus can be accounted for in computing device 200 and/or reader 40, such that, if a substantial number of bars or a number of bars which is not within the stored information in computing device 200 and/or reader 40 is blocked by the skewed media, an error signal can be provided.

Figure 2B:
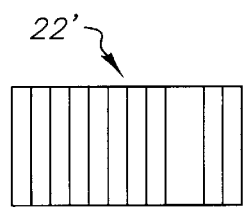
FIG. 2B is a further example of a measuring pattern.
Figure 4:
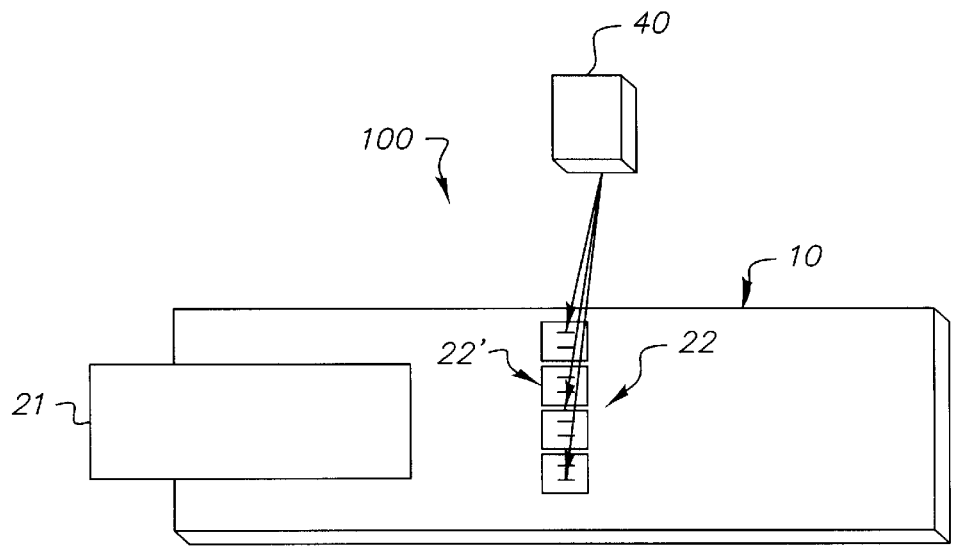
FIG. 4 shows an example of a measuring pattern used in the media width detecting system of the present invention.
Figure 5:
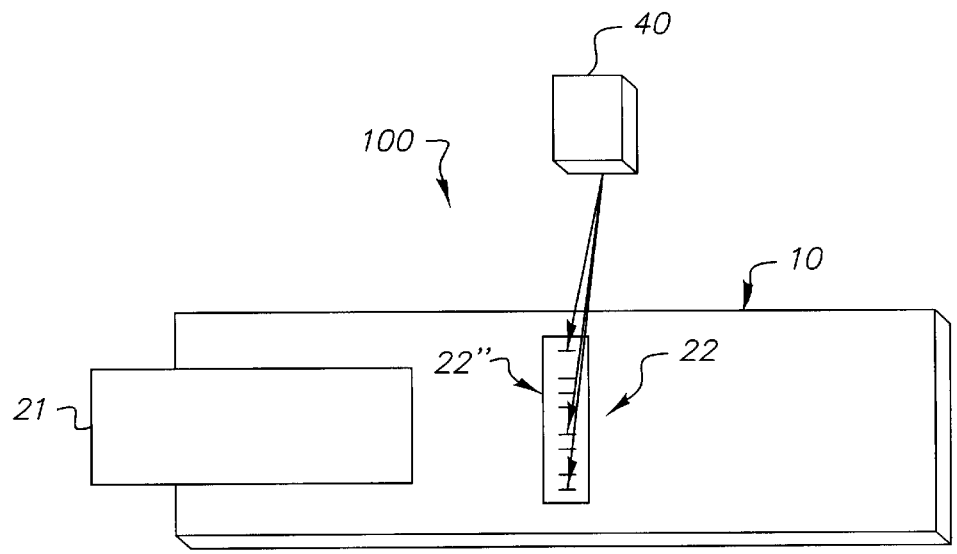
FIG. 5 shows a further example of a measuring pattern used in the media width detecting system of the present invention.

As noted above, measuring pattern 22 is preferably a bar code pattern having a row of plain bars 25, either with fixed spacing or a fixed number of bars. As a further option, measuring pattern 22 can be a bar code pattern having properly formed bar codes with start and stop sentinels, multiple bar widths, etc., as found in UPC and similar bar codes (see reference number 22' in FIG. 2B). As a still further option, as shown in FIG. 4, measuring pattern 22 can be in the form of multiple properly formed bar codes (for example, bar codes in groups 22') that each represent a displacement measure across the media path. As a still further option for measuring pattern 22, measuring pattern 22 can be in the form of a single sticker and/or label 22" for the bar code or painted bars as shown in FIG. 5. Further, measuring pattern 22 can be etched/molded into the media path material of media path 10. Also, measuring pattern 22 can comprise bars of non-uniform bar widths that each relate to a discrete media width.

Since the present invention uses a reader that measures a media width based on covered and uncovered bars of a bar code, it is not affected by the material of the media and thus, can read black or white media as well as gray media.

Figure 6:
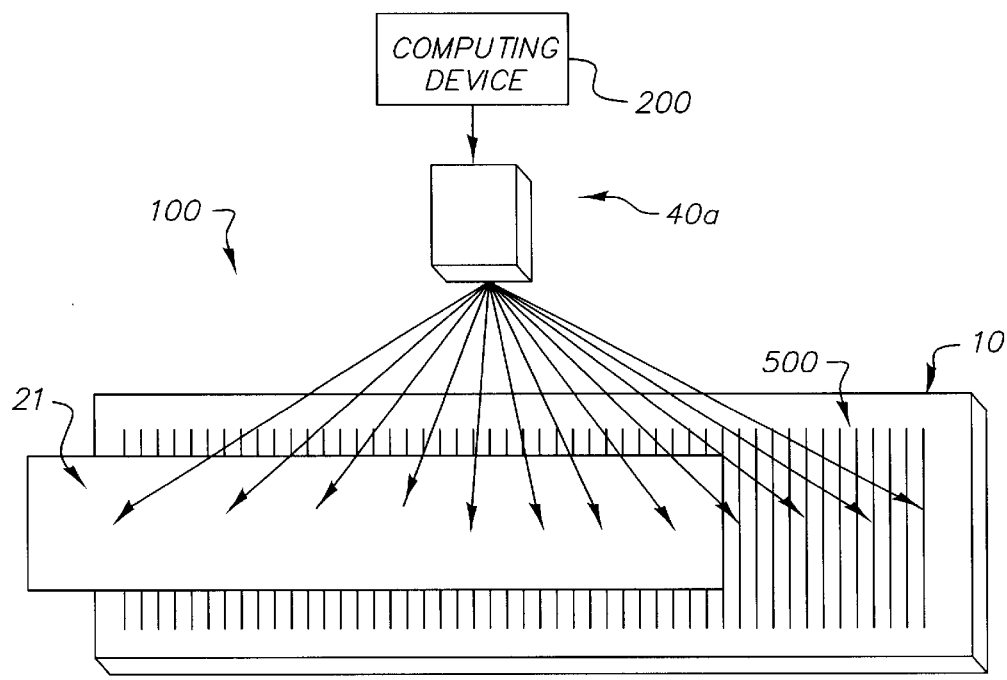
FIG. 6 schematically illustrates a feature of the media width detecting system of the present invention.
Figure 7:
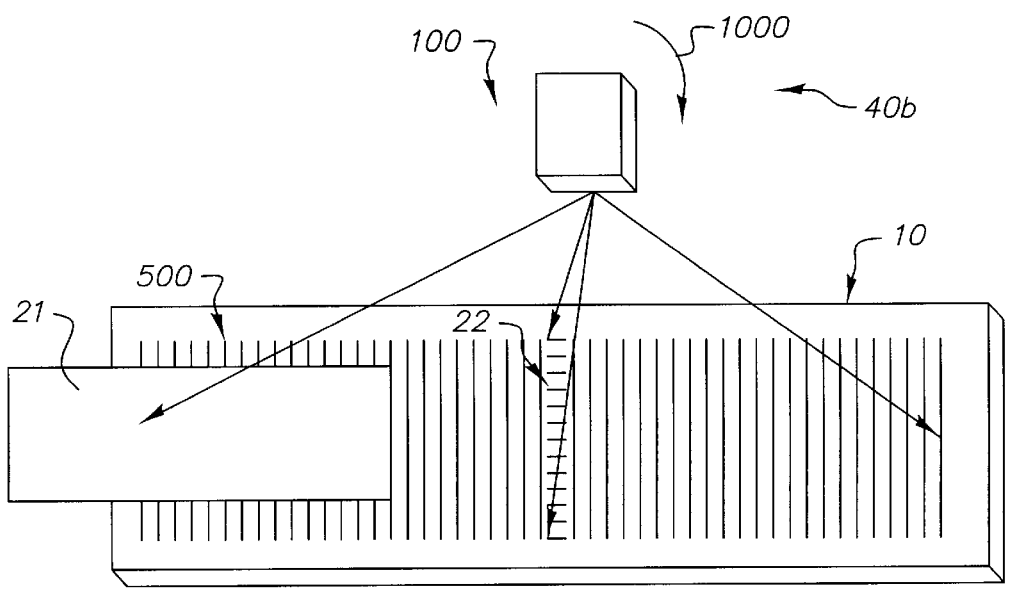
FIG. 7 illustrates a further feature of the detecting system of the present invention.

With regard to reader 40, reader 40 can be fixed or can be movable or rotatable to multiple locations so as to enable the reading of a media width at the multiple locations. Therefore, you could have a reader 40 that can be rotated or moved so as to read a longitudinally extending bar code pattern, or a second reader dedicated to the longitudinally extending bar code pattern. By having a second reader or a single reader that can be moved or rotated so as to read longitudinally extending bar code patterns, it would possible to also calculate a length of media. Therefore, with this alternative embodiment, reader 40 can be positioned in a first position as illustrated in FIG. 1 so as to measure a width of the media by way of measuring pattern 22. A second reader 40a (FIG. 6) can be positioned at a second location so as to measure a second measuring pattern 500 which extends longitudinally to determine a length of the media. By turning the bars orthogonal to a widthwise direction of the media (i.e. using measuring pattern 500 which extends longitudinally), reader 40a can further be used as a media encoder, an absolute measure of media positioned lengthwise down the track or to check the position of incoming media. In the preferred feature of the invention, a single reader 40b (FIG. 7) that is movable or rotatable between the position shown in FIG. 1 to read widthwise extending measuring pattern 22 (a first measuring pattern), and the position shown in FIG. 6 or 7 to read longitudinally extending measuring pattern 500 (a second measuring pattern) is used. In this embodiment, the reader can be mounted about a rotatable mount so as to rotate as shown by arrow 1000 in FIG. 7. As a still further option, any of readers 40, 40a, 40b and 40c as disclosed in the present specification could be a two dimensional scanner which could read along the longitudinal and horizontal axes without requiring rotatation and/or movement.

In a further feature of computing device 20 and/or reader 40, the number of bars which are covered as noted above can be calculated, and the width can be computed and compared to a look-up table. In still a further feature of reader 40, reader 40 does not have to be in the form of an optical scanner, and it could read on the basis of light, neutrons, air, etc.

Figure 8A:
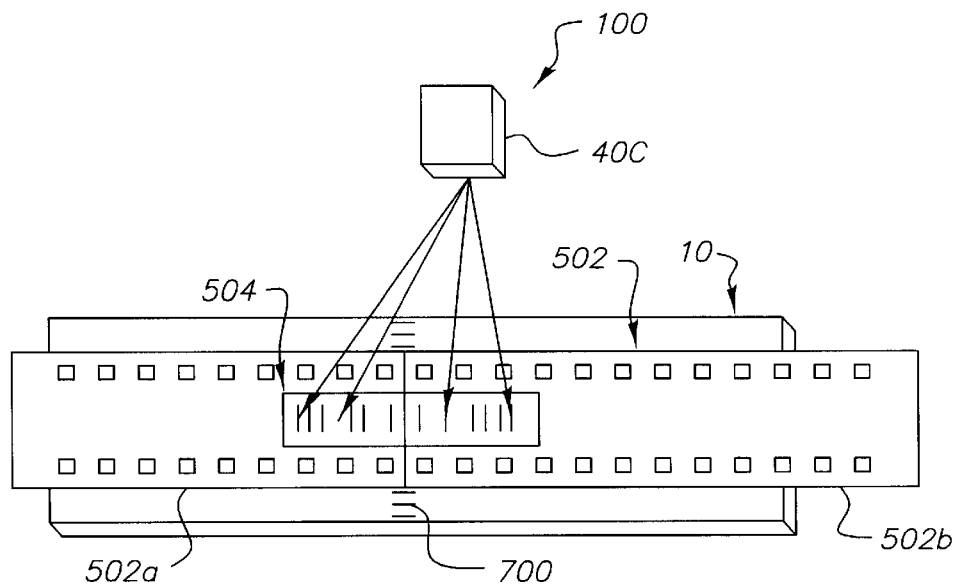
FIG. 8A illustrates an additional feature of the media width detecting system of the present invention.

The present invention is also applicable to measuring the width of other media such as photosensitive film 502 as shown in FIG. 8A. In measuring the width of photosensitive film, in order to avoid confusion with a splice bar code pattern 504 that is used between spliced orders 502*a*, 502*b*, the bars of a measuring pattern 700 can be set up as distinct from the splice bar code pattern 504. In this embodiment, it would be possible to use a second reader to read measuring pattern 700, or use an existing splice bar code reader 40*c* and modify the existing reader so as to read the bar codes of measuring pattern 700 in the media path, as opposed to the splice bar code pattern 504. More specifically, reader 40*c* would be programmed to distinguish the two patterns. As further enhancements, reader 40*c* can be movable or two-dimensional to deal with different orientations.

Figure 8B:
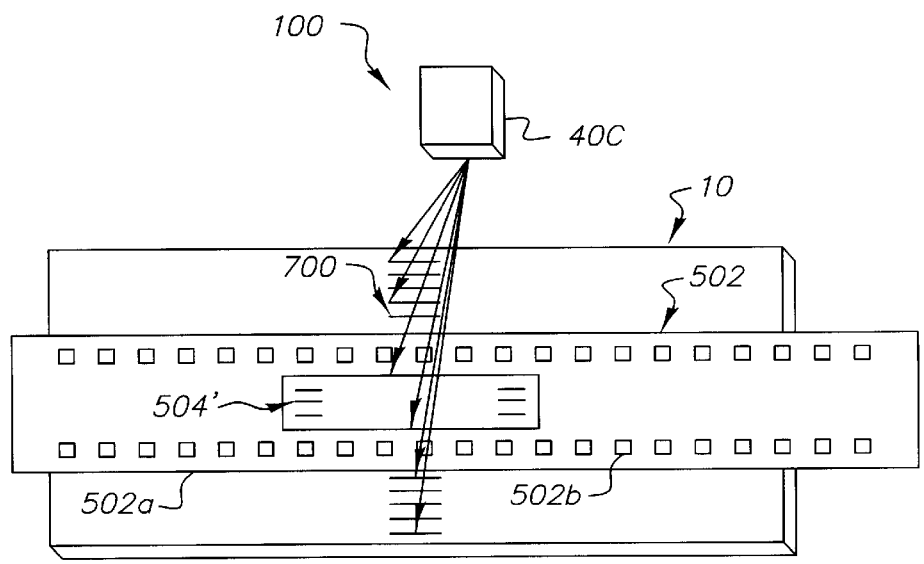
FIG. 8B illustrates a further feature of the media width detecting system of the present invention.

FIG. 8B illustrates a different arrangement which can be used in the present invention. The arrangement of FIG. 8B differs from FIG. 8A with regard to splice code bar pattern 504. In FIG. 8B, splice code bar pattern 504' includes bars which are oriented in the same direction as the bars of measuring pattern 700. That is, the bars of splice code bar pattern 504' are oriented so as to extend in the direction of travel of film 502. Within the context of the present invention, reader 40*c* can be programmed to read and/or distinguish measuring pattern 700 from splice code bar pattern 504'. As a further option, a second reader can be used such that one reader can be dedicated to read pattern 700 and the second reader can be dedicated to read pattern 504'.

Figure 9:
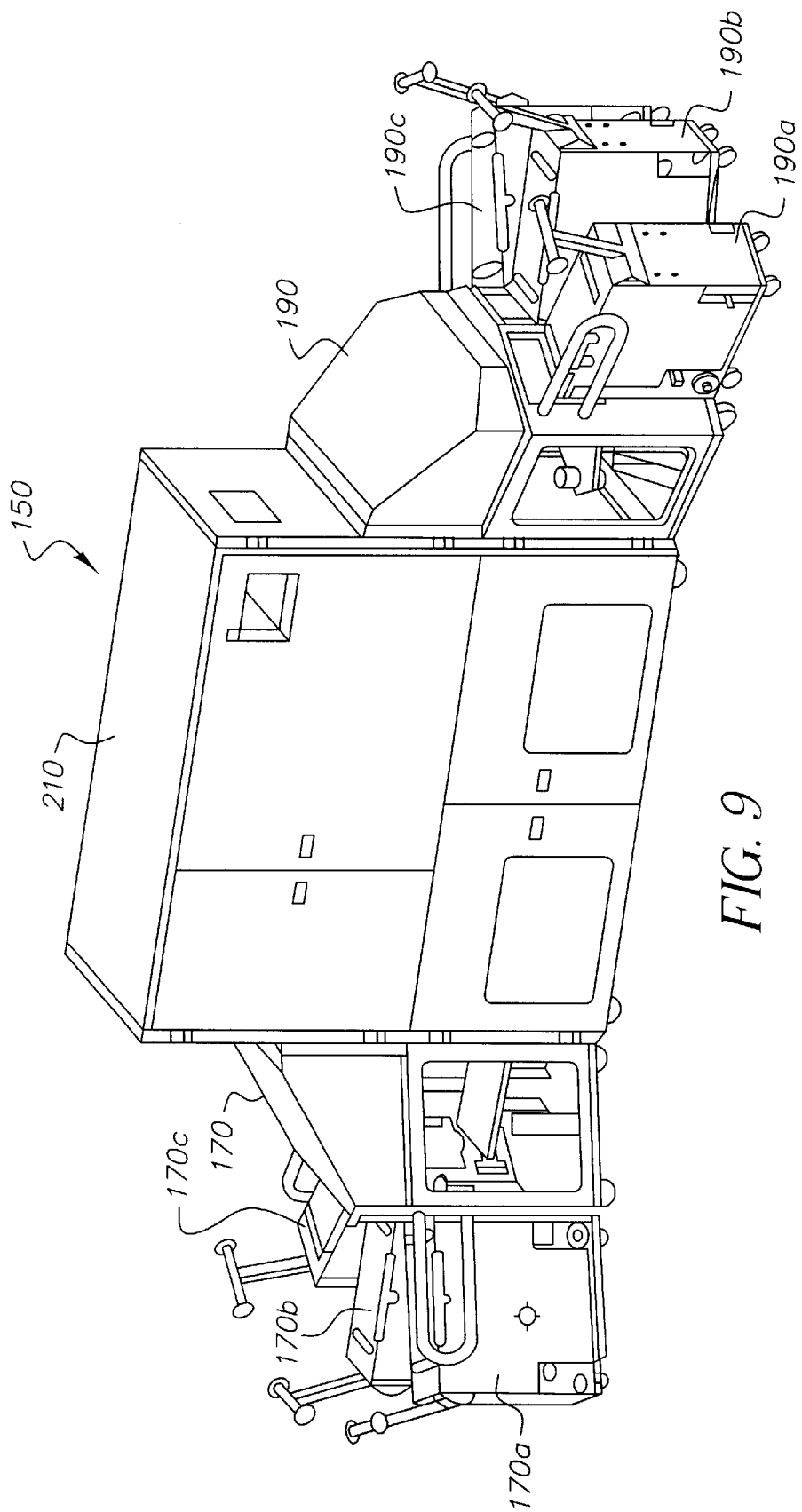
FIG. 9 is an example of an imaging apparatus such as a printer which can incorporate the media width detecting system of the present invention.

FIG. 9 shows an example of an imaging apparatus which can use a media width detecting system as disclosed by the present invention. In FIG. 9, the imaging apparatus is in the form of a printing apparatus 150, such as a digital printer, that comprises a media supply section 170 and a media take-up section 190. Media supply section 170 is adapted to accommodate a plurality of media supply cassettes 170*a*, 170*b*, 170*c*, while media take-up section 190 is adapted to accommodate a plurality of media take-up cassettes 190*a*, 190*b*, 190*c*. On the supply side, supply cassettes 170*a*–170*c* can each contain a roll of, for example, media that is to be processed through a printing section 210. Take-up cassettes 190*a*–190*c* on the take-up side are essentially empty and are adapted to receive a roll of media after it has passed through printing section 210.

Media width detecting system 100 as illustrated in FIG. 1 can be provided on the media path(s) within supply section 170 such that it would be able to measure the width of media that is supplied from any of cassettes 170*a*, 17*b*, 170*c*. The specifics of printing apparatus 150 is described in U.S. Pat. No. 6,227,731 issued May 8, 2001. Within the context of the present invention, three distinct media width detecting systems 100 can be utilized, with each media detecting system being positioned in a media path that is dedicated to each cassette 170*a*, 170*b*, 170*c*. As a further option, a single reader 40 that is rotatable to each of the media paths dedicated to cassettes 170*a*, 170*b*, 170*c* can be used in supply section 170. In this example, each of the media paths can include a measuring pattern. As a still further option and referring to, for example, FIGS. 10 and 11, media width detecting system 100 of the present invention, can be associated with each one of the cassettes 170*a*, 170*b*, 170*c* as shown.

Therefore, in an arrangement where there are multiple cassettes such as illustrated in FIG. 9, a media with detecting system 100 as disclosed in the present invention would be advantageous in that you would not need an edge guide to measure the width.

Figure 10:
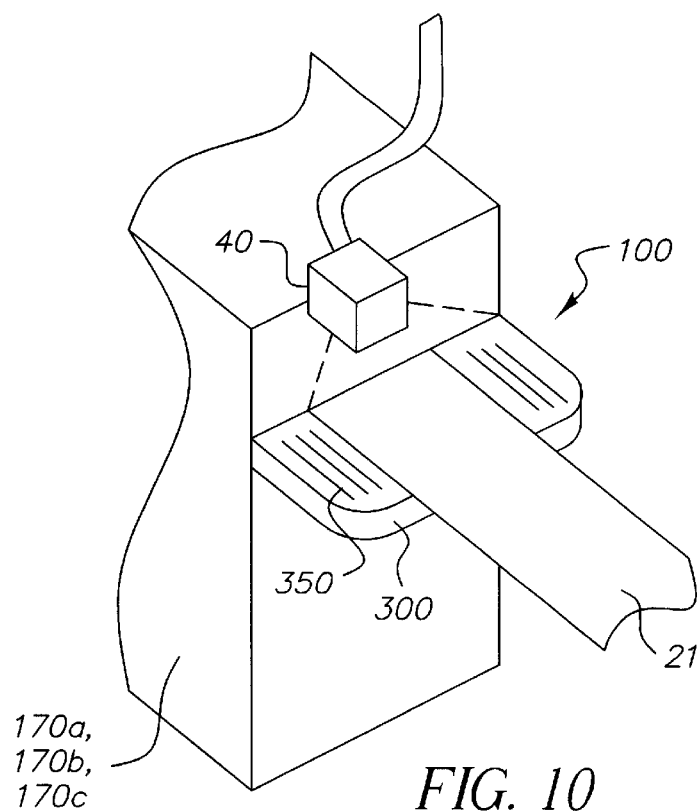
FIG. 10 is a further implementation example of a media width detecting system in accordance with the present invention.
Figure 11:
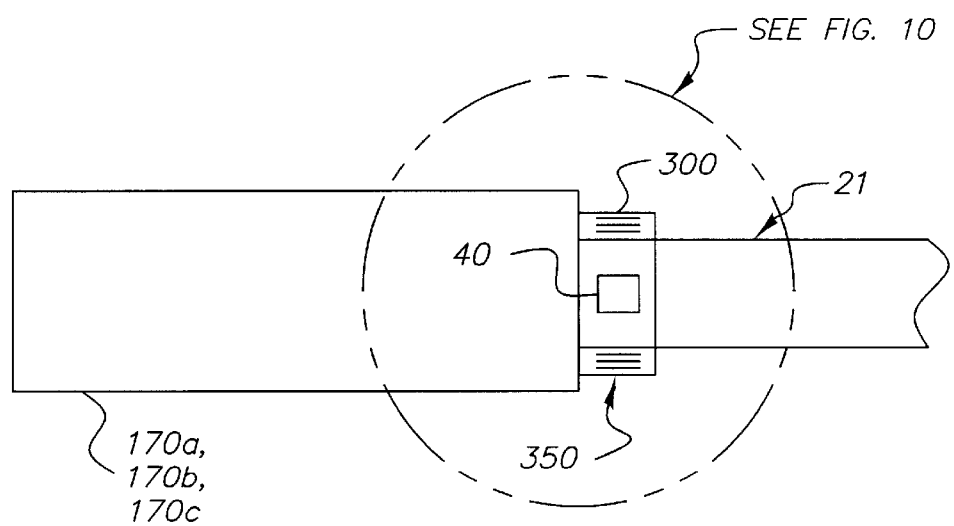
FIG. 11 is a top view of the system of FIG. 10.

As shown in FIGS. 10 and 11, a measuring pattern 350 similar to measuring pattern 22 (FIG. 1) can be placed below a paper surface at a throat 300 of any of cassettes 170*a*, 170*b*, 170*c*, or any place where the media exits the cassette. In this embodiment, media width detecting system 100 would be placed at an exit of each cassette 170*a*, 170*b*, 170*c*. Reader 40 would be provided relative to measuring pattern 350 to enable a reading of the measuring pattern. Reader 40 can be mounted on cassette 170*a*, 170*b*, 170*c* or some other area of the printer etc. which enables a positioning of the reader as shown. By placing reader 40 over measuring pattern 350 as illustrated in FIG. 10, reader 40 can scan measuring pattern 350 as previously described and compute the number of bars that are blocked by media 21 traversing measuring pattern 350. Therefore, the width of the media exiting cassette 170*a*, 170*b*, 170*c* would be determined in the same manner as described with reference to FIG. 1.

As a further option, instead of a reader for each cassette, a single reader that is movable to a location over the measuring pattern at each cassette throat can be used.

Like the example of FIG. 1, this system would tolerate paper skew at the cassette throat since no edge guide would be needed. In the arrangement of FIGS. 10 and 11, there would be a measuring pattern 350 and a reader 40 at each cassette 170*a*, 170*b*, 170*c*, or as an alternative, a measuring pattern 350 at each cassette and a single reader 40 movable or rotatable to each cassette, so that when new media or paper is loaded, the width could be determined before it is spliced. This eliminates the loading of the wrong media or paper width into a cassette.

Therefore, the present invention provides for a media width detecting system which accurately and quickly determines a media width. The system of the present invention utilizes a measuring pattern in the form of, for example, a bar code that has a width that exceeds the largest paper or media width being used. A reader in the form of, for example, a scanner or sensor is positioned to view the fill width of the measuring pattern. When paper traverses the measuring pattern, a portion of the measuring pattern within the outer edges is not sensed. By subtracting the missing portion from the full width of the measuring pattern, a media width can be calculated.

The invention has been described in detail with particular reference to certain preferred embodiments thereof, but it will be understood that variations and modifications can be effected within the spirit and scope of the invention.

What is claimed is:

1. A media width detecting system comprising:
    a measuring pattern provided across a width of a media path;
    a reader positioned to view a full width of the measuring pattern, wherein media in the media path which traverses the measuring pattern blocks a portion of the measuring pattern from being viewed by the reader and leaves other portions of the measuring pattern exposed for viewing by the reader; and
    a computing device operationally associated with the reader which determines a width of the media traversing the measuring pattern based on a difference between the full width of the measuring pattern and a width of the other portions of the measuring pattern left exposed for viewing by the reader when the media traverses the measuring pattern
    wherein said measuring pattern extends along an entire width of the media path and comprises a plurality of bars placed at fixed intervals.

2. A media width detecting system comprising:
    a measuring pattern provided across a width of a media path;

a reader positioned to view a full width of the measuring pattern, wherein media in the media path which traverses the measuring pattern blocks a portion of the measuring pattern from being viewed by the reader and leaves other portions of the measuring pattern exposed for viewing by the reader; and a computing device operationally associated with the reader which determines a width of the media traversing the measuring pattern based on a difference between the full width of the measuring pattern and a width of the other portions of the measuring pattern left exposed for viewing by the reader when the media traverses the measuring pattern;

wherein said measuring pattern extends along an entire width of the media path and comprises spaced bars of multiple widths.

3. A media width detecting system according to claim 1, wherein said measuring pattern is a sticker label.

4. A media width detecting system according to claim 1, wherein said measuring pattern is painted onto said media path.

5. A media width detecting system according to claim 1, wherein said measuring pattern is etched onto said media path.

6. A media width detecting system according to claim 1, wherein said measuring pattern is molded onto said media path.

7. A media width detecting system according to claim 1, wherein said plurality of bars comprises alternating reflective and non-reflective bars, and said reader is an optical bar code reader.

8. A media width detecting system according to claim 1, wherein said media width detecting system is provided at a throat of a cassette which holds media.

9. A media width detecting system according to claim 1, wherein said media width detecting system is provided within an imaging apparatus.

10. A media width detecting system comprising:
a measuring pattern including a predetermined number X of total bars provided at intervals on a media path so as to extend along a width of the media path;
a reader provided relative to said media path so as to view an entire width of the measuring pattern, wherein media in the media path which traverses the measuring pattern provides for a first number N of uncovered bars on one side or both sides of the media which can be read by the reader; and
a computing device operationally associated with the reader which computes a second number W of bars covered by the media traversing the measuring pattern based on a difference between the predetermined number X of total bars and the first number N of uncovered bars to determine a width of the media traversing the measuring pattern.

11. A media width detecting system according to claim 10, wherein said measuring pattern is painted onto said media path.

12. A media width detecting system according to claim 10, wherein said measuring pattern is etched onto said media path.

13. A media width detecting system according to claim 10, wherein said measuring pattern is molded onto said media path.

14. A media width detecting system according to claim 10, wherein said bars of said measuring pattern are alternating reflective and non-reflective bars and said reader is an optical bar code reader.

15. A media width detecting system according to claim 10, wherein said media width detecting system is provided at an exit of a cassette which holds media.

16. A media width detecting system according to claim 10, wherein said media width detecting system is provided within an imaging apparatus.

17. A media width detecting system comprising:
a measuring pattern comprising a plurality of spaced bars;
a reader positioned to view the measuring pattern, wherein media which traverses the measuring pattern blocks a portion of the measuring pattern from being viewed by the reader; and
a computing device operationally associated with the reader which determines a width of the media traversing the measuring pattern based on at least a width of the portion of the measuring pattern blocked by the media traversing the measuring pattern.

18. A media width detecting system according to claim 17, wherein said measuring pattern extends along an entire width of a media path for the media, and said plurality of bars are placed at fixed intervals.

19. A media width detecting system according to claim 17, wherein said measuring pattern extends along an entire width of the media path and said bars are spaced bars of multiple widths.

20. A media width detecting system according to claim 17, wherein said measuring pattern is a sticker label that extends along an entire width of the media path.

21. A media width detecting system according to claim 17, wherein said measuring pattern is painted onto said media path and extends along an entire width of the media path.

22. A media width detecting system according to claim 17, wherein said measuring pattern is etched onto said media path and extends along an entire width of the media path.

23. A media detecting system according to claim 17, wherein said measuring pattern is molded onto said media path and extends along an entire width of the media path.

24. A media width detecting system according to claim 17, wherein said bars of said measuring pattern are alternating reflective and non-reflective bars, and said reader is an optical bar code reader.

25. A media width detecting system according to claim 17, wherein said media width detecting system is provided at an exit of a cassette which holds media.

26. A media width detecting system according to claim 17, wherein said media width detecting system is provided within an imaging apparatus.

27. A media width detecting system according to claim 17, wherein said media is in the form of cut sheets or a web, and the media is at least one of paper, photographic paper, or photosensitive film.

28. A media size detecting system comprising:
a first measuring pattern provided across a width of a media path;
a second measuring pattern provided on the media path so as to extend along a longitudinal direction of the media; and
a reader adapted to read the first measuring pattern to determine a width of media traversing the first measuring pattern, and read the second measuring pattern to determine a length of media traversing the second measuring pattern;
wherein said reader is an optical scanner.

29. A media size detecting system according to claim 28, wherein said first and second measuring patterns are bar codes.

30. A media size detecting system comprising:
a first measuring pattern provided across a width of a media path;
a second measuring pattern provided on the media path so as to extend along a longitudinal direction of the media; and
a reader adapted to read the first measuring pattern to determine a width of media traversing the first measuring pattern, and read the second measuring pattern to determine a length of media traversing the second measuring pattern;
wherein said reader is movable between a first position to read the first measuring pattern and a second position to read the second measuring pattern.

31. A media with detecting system according to claim 28, wherein said reader is a two-dimensional scanner which reads the first and second measuring patterns.

32. A method of measuring a size of media being conveyed along a media path, the method comprising:
providing a first measuring pattern across a width of the media path;
positioning a reader relative to the media path so as to view a full width of the first measuring pattern;
determining a width of media in the media path which traverses the first measuring pattern based on at least a width of a portion of the first measuring pattern which is blocked from being viewed by the reader by the media traversing the first measuring pattern;
providing a second measuring pattern along a longitudinal direction of the media path; and
determining a length of media traversing the second measuring pattern based on an amount of the second measuring pattern which is blocked from being viewed by the reader by the media traversing the second measuring pattern;
wherein said first and second measuring patterns comprise a plurality of spaced bars and said reader is an optical scanner.

33. A method according to claim 32, wherein said step of determining the width of the media comprises:
computing a difference between the full width of the first measuring pattern and a width of other portions of the first measuring pattern left exposed for viewing by the reader when the media traverses the first measuring pattern, said difference being equal to the width of the portion of the first measuring pattern which is blocked by the media traversing the first measuring pattern.

34. A printing apparatus comprising:
a media supply section having at least one media entry opening for the passage of media therethrough;
a printing section adapted to accept media from the media supply section;
a media path for the passage of media from the media supply section to the printing section; and
a media width detecting system positioned on said media path;
said media width detecting system comprising:
a measuring pattern provided across a width of the media path;
a reader positioned relative to the media path to view the measuring pattern, wherein media in the media path which traverses the measuring pattern blocks a portion of the measuring pattern from being viewed by the reader; and
a computing device operationally associated with the reader which determines a width of the media traversing the measuring pattern based on at least a width of the portion of the measuring pattern blocked by the media traversing the measuring pattern;
wherein said measuring pattern comprises a plurality of spaced bars and said reader is a scanner.

35. A printing apparatus according to claim 34, comprising a further measuring pattern provided along a longitudinal direction of the media path;
wherein:
said reader is adapted to read the further measuring pattern; and
said computing device is operationally associated with said reader to determine a length of media traversing the further measuring pattern based on an amount of the further measuring pattern which is blocked from being viewed by the reader by the media traversing the further measuring pattern.

36. A printing apparatus comprising:
a media supply section having at least one media entry opening for the passage of media therethough;
at least one media supply cassette having a media supply roll therein and positioned at said at least one media entry opening to supply media to said media supply section;
a printing section adapted to accept media from the media supply section; and
a media width detecting system positioned at an exit of said at least one media supply cassette;
said media width detecting system comprising:
a measuring pattern positioned on a media path at said exit;
a reader positioned to view the measuring pattern, wherein media which traverses the measuring pattern blocks a portion of the measuring pattern from being viewed by the reader; and
a computing device operationally associated with the reader which determines a width of the media traversing the measuring pattern based on at least a width of the portion of the measuring pattern blocked by the media traversing the measuring pattern;
wherein said measuring pattern is a plurality of spaced bars and said reader is a code reader.

37. A media width detecting system comprising:
a measuring pattern comprising a plurality of spaced bars; and
a reader positioned to view the measuring pattern, wherein media which traverses the measuring pattern blocks a portion of the measuring pattern from being viewed by the reader, and a width of the media traversing the measuring pattern is determined based on at least a width of the portion of the measuring pattern blocked by the media traversing the measuring pattern.

38. A media width detecting system according to claim 37, wherein said measuring pattern extends along an entire width of a media path for the media, and said bars are placed at fixed intervals.

39. A media width detecting system according to claim 37, wherein said measuring pattern extends along an entire width of a media path for the media and said bars are of multiple widths.

40. A printing apparatus comprising:
a media supply section having at least one media entry opening for the passage of media therethrough;

a printing section adapted to accept media from the media supply section;

a media path for the passage of media from the media supply section to the printing section; and a media width detecting system positioned on said media path;

said media width detecting system comprising:

a measuring pattern provided across a width of the media path; and a reader positioned relative to the media path to view the measuring pattern, wherein media in the media path which traverses the measuring pattern blocks a potion of the measuring pattern from being view by the reader, and a width of the media traversing the measuring pattern is measured based on at least a width of the portion of the measuring pattern blocked by the media traversing the measuring pattern.

41. A printing apparatus according to claim 40, wherein said measuring pattern comprises a plurality of spaced bars and said reader is a scanner.

42. A media width detecting system according to claim 2, wherein said measuring pattern is a sticker label that extends along an entire width of the media path.

43. A media width detecting system according to claim 2, wherein said measuring pattern is painted onto said media path.

44. A media width detecting system according to claim 2, wherein said measuring pattern is etched onto said media path.

45. A media width detecting system according to claim 2, wherein said measuring pattern is molded onto said media path.

46. A media width detecting system according to claim 2, wherein said plurality of bars comprises alternating reflective and non-reflective bars, and said reader is an optical bar code reader.

47. A media width detecting system according to claim 2, wherein said media width detecting system is provided at a throat of a cassette which holds media.

48. A media width detecting system according to claim 1, wherein said media width detecting system is provided within an imaging apparatus.

* * * * *